(12) United States Patent
Lee et al.

(10) Patent No.: US 7,426,537 B2
(45) Date of Patent: Sep. 16, 2008

(54) SYSTEMS AND METHODS FOR SHARING DYNAMIC CONTENT AMONG A PLURALITY OF ONLINE CO-USERS

(75) Inventors: Oliver Lee, Redmond, WA (US); Quji Guo, Kirkland, WA (US); Joel K. Grossman, Seattle, WA (US); Brian D. Wentz, Seattle, WA (US); Jordan L. K. Schwartz, Seattle, WA (US); Christopher J. Araman, Seattle, WA (US); Randall Knight Winjum, Woodinville, WA (US); Shelly Farnham, Seattle, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 610 days.

(21) Appl. No.: 10/160,846

(22) Filed: May 31, 2002

(65) Prior Publication Data

US 2003/0225834 A1 Dec. 4, 2003

(51) Int. Cl.
*G06F 15/16* (2006.01)
*G06F 3/00* (2006.01)
(52) U.S. Cl. .................... 709/204; 709/205; 715/753; 715/758
(58) Field of Classification Search ................ 709/203, 709/204–206, 205, 206, 227, 231, 245, 230–235; 715/738, 739, 753, 758
See application file for complete search history.

(56) References Cited

U.S. PATENT DOCUMENTS

| | | | |
|---|---|---|---|
| 5,206,934 A | 4/1993 | Naef, III | 395/200 |
| 5,568,181 A | 10/1996 | Greenwood et al. | 348/7 |
| 5,778,398 A | 7/1998 | Nagashima et al. | 707/501 |
| 5,977,989 A | 11/1999 | Lee et al. | 345/503 |
| 5,996,022 A * | 11/1999 | Krueger et al. | 709/247 |
| 6,009,469 A * | 12/1999 | Mattaway et al. | 709/227 |

(Continued)

FOREIGN PATENT DOCUMENTS

WO       WO 03050659 A2  *  6/2003

OTHER PUBLICATIONS

"Review: Microsoft Windows Media Player 7.0", Stoner, Colin, MP3newswire.net, May 23, 2001, <http://www.mp3newswire.net/stories/2001/wmaplayer.html>.*

(Continued)

*Primary Examiner*—Glenton B. Burgess
*Assistant Examiner*—Aaron Strange
(74) *Attorney, Agent, or Firm*—Woodcock Washburn LLP

(57) ABSTRACT

Systems and methods for establishing a shared dynamic content experience are disclosed. A method for sharing a dynamic content experience according to the invention includes an inviter computer communicating, via a first communication path between an invitee computer and a network based communication server, an invitation to establish a shared dynamic content experience between the inviter computer and the invitee computer. If the invitation is accepted, a content sharing communication path is established between the inviter computer and the invitee computer. Information relating to a current dynamic content experience at the inviter computer is communicated, via the content sharing communication path, to the invitee computer. Information relating to a current dynamic content experience at the invitee computer is communicated, via the content sharing communication path, to the inviter computer.

29 Claims, 12 Drawing Sheets

U.S. PATENT DOCUMENTS

| | | | |
|---|---|---|---|
| 6,226,672 B1* | 5/2001 | DeMartin et al. | 709/219 |
| 6,240,444 B1 | 5/2001 | Fin et al. | 709/205 |
| 6,310,632 B1 | 10/2001 | Monroe et al. | 345/808 |
| 6,941,324 B2* | 9/2005 | Plastina et al. | 707/104.1 |
| 7,386,798 B1* | 6/2008 | Heikes et al. | 715/752 |
| 2002/0023134 A1* | 2/2002 | Roskowski et al. | 709/206 |
| 2002/0144276 A1* | 10/2002 | Radford et al. | 725/87 |
| 2003/0041108 A1* | 2/2003 | Henrick et al. | 709/205 |
| 2003/0126211 A1* | 7/2003 | Anttila et al. | 709/205 |
| 2003/0177184 A1* | 9/2003 | Dickerman et al. | 709/204 |
| 2008/0065997 A1* | 3/2008 | Szeto et al. | 715/753 |

OTHER PUBLICATIONS

"Managing Music on Your Pocket PC", Dumad, Diane Alicia, Smartphone & Pocket PC Magazine, May 2001. <http://www.pocketpcmag.com/_archives/may01/ManagingMusic.asp>.*

Aoki, Y., "Collaborative environment for supporting web users," *IEEE*, 2001, 4, 2309-2316.

Huang, R., et al., "A java technology based shared browser for tele-lecturing in University21," *IEEE*, 2001, 298-302.

Kobayashi, M., et al., "Collaborative customer services using synchronous web browser sharing," *ACM*, 1998, 99-108.

Parnes, P., et al., "mSTAR: Enabling collaborative applications on the internet," *IEEE*, Sep.-Oct. 2000, 4(5), 32-39.

Semenza, G.L., "HIF-1: Using two hands to flip the angiogenic switch," *Cancer and Metastasis Reviews*, 2000, 19, 59-65.

Souya, T., et al., "Joint class experiments based on realtime web-browser synchronization," *PROC 3rd Asia Pacific Computer Human Interaction*, 1998, 98EX110, 367-372.

* cited by examiner

SYSTEMS AND METHODS FOR SHARING DYNAMIC CONTENT AMONG A PLURALITY OF ONLINE CO-USERS

CROSS-REFERENCE TO RELATED APPLICATIONS

The subject matter disclosed herein is related to the subject matter disclosed in U.S. patent application Ser. No. 10/160,848, filed May 31, 2002, entitled "Systems And Methods For Shared Browsing Among A Plurality Of Online Co-Users," the contents of which are hereby incorporated herein by reference.

TECHNICAL FIELD

This invention relates to providing dynamic content in a network environment. More particularly, the invention relates to systems and methods for enabling a plurality of client computers to establish and share a common dynamic content experience.

BACKGROUND OF THE INVENTION

Media players that reside on a client computer and allow a user to download and experience a variety of dynamic content are known in the art. For example, users can download media files associated with music and listen to the music via their media player. Systems and methods are known in the art that enable media content to be packaged and delivered, via a network, in a manner that can enhance the user experience by providing a user with not only media content, but additional content that adds value to the media content.

Network based communication services that track a plurality of online co-user accounts and provide communication pathways to interconnect two or more such online co-user accounts are also well known. Examples of such network based communication services include electronic mail ("email") and online messaging services such as instant message services. Such communication services can maintain lists of user accounts, and even track current status information about the user accounts, such as whether the accounts are active (i.e., the user is currently online).

Online messaging services, for example, typically provide and maintain user definable online co-user lists, which are more commonly referred to as "contacts" lists. A number of companies operate host systems that include online message services that alert users when other pre-specified co-users (i.e., other users of the online message service that have been previously specified by the user as a contact) are online (i.e., concurrently accessing the online messaging service). Such online co-users can typically use the online messaging service to send "instant messages" to one another via a communication path that the online messaging service provides.

There are certain situations in which it would be desirable for a plurality of online co-users to share a dynamic content experience. That is, the online co-users would benefit from being able to experience the same dynamic content at the same time. For example, two online co-users located at different computers in different parts of the world might want to listen to a song, or watch a video clip together. Each of the users would benefit from being able to share the other's experience, such that, when either user plays a song, for example, the media player at the other computer would play the same song automatically. Hence, there is a need in the art for systems and methods for enabling a plurality of co-users to establish and share a common dynamic content experience.

SUMMARY OF THE INVENTION

The invention provides systems and methods for enabling a plurality of online co-users at respective client computers to establish and share a common dynamic content experience. According to the invention, a plurality of online co-users share a dynamic content experience over the Internet using a shared playlist with tracks from each user's computer. The tracks are synchronized, to the extent possible, while playing. Thus, a number of users are enabled to share a dynamic content experience.

A method according to the invention for establishing a shared dynamic content experience includes receiving from an invitee computer, via a first communication path between an inviter computer and a network based communication server, an acceptance of an invitation to establish a shared dynamic content experience between the inviter computer and the invitee computer. A content sharing communication path is then established between the inviter computer and the invitee computer. Thereafter, the inviter and invitee clients communicate to each other, via the content sharing communication path, information relating to a shared dynamic content experience between the clients.

To establish the content sharing communication path, a connection message is communicated from the inviter computer to the invitee computer via the first communication path. The inviter computer determines whether a reply from the invitee computer has been received, and, if so, the content sharing communications path is thus established between the inviter computer and the invitee computer. If the reply is not received, the invitee computer communicates a connection message to the inviter computer via the first communication path. The inviter computer sends a reply to the invitee computer to thereby establish the content sharing communication path.

A method for providing dynamic content according to the invention may also include providing respective status displays at each of the client computers that provides current status of the dynamic content sharing experience at the other client computer. The status display at each client can include status relating to at least one of starting, playing, pausing, stopping, and skipping an audio track at the other client. The status displays can also include, for example, status relating to online messenger status, or a friendly name associated with a pre-specified online co-user account associated with the other client.

BRIEF DESCRIPTION OF THE SEVERAL VIEWS OF THE DRAWING

Other features of the invention are further apparent from the following detailed description of the embodiments of the present invention taken in conjunction with the accompanying drawing.

DETAILED DESCRIPTION OF THE INVENTION

Exemplary Computing Device

Figure 1:
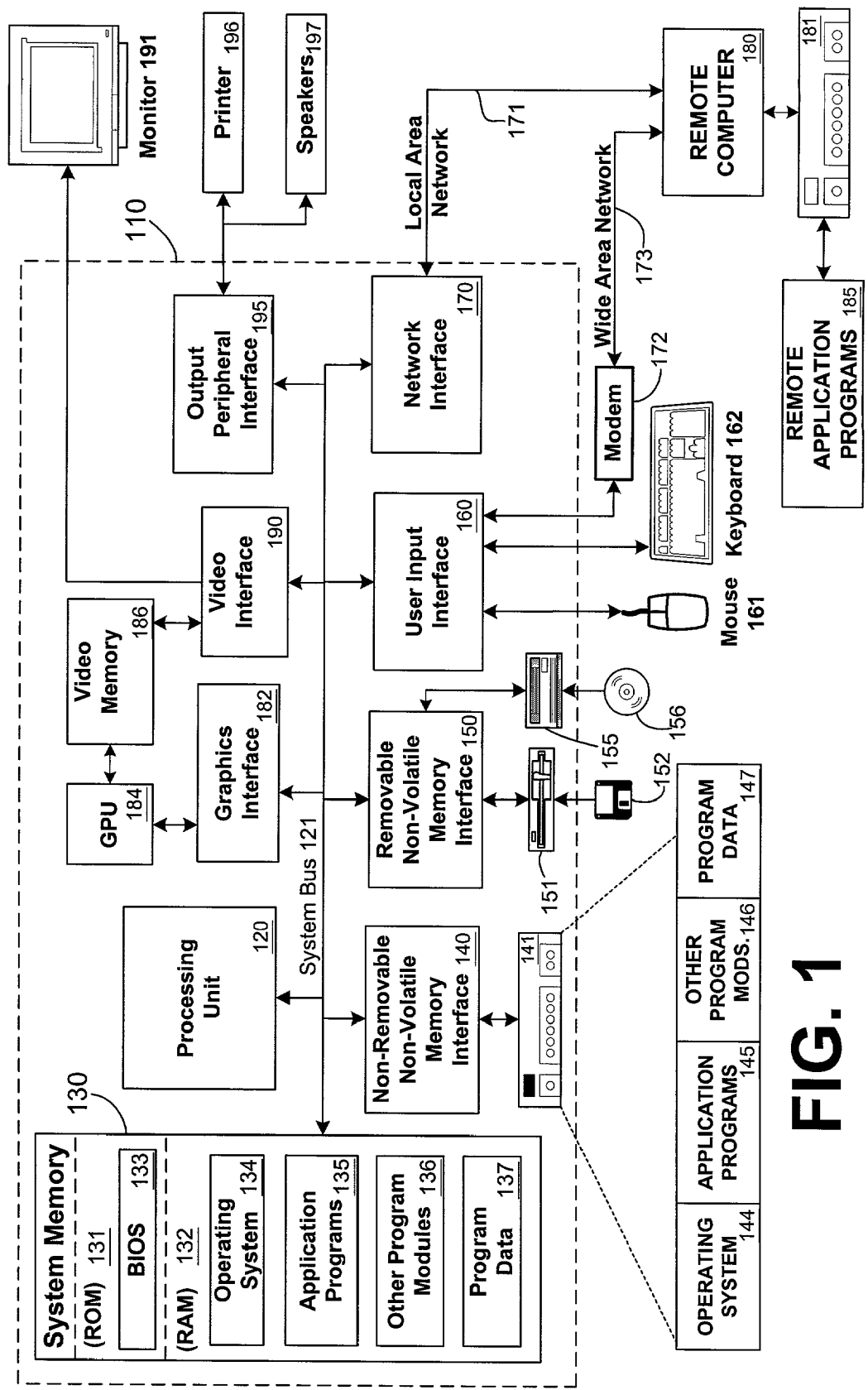
FIG. 1 is a block diagram representing an exemplary non-limiting computing device in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 2:
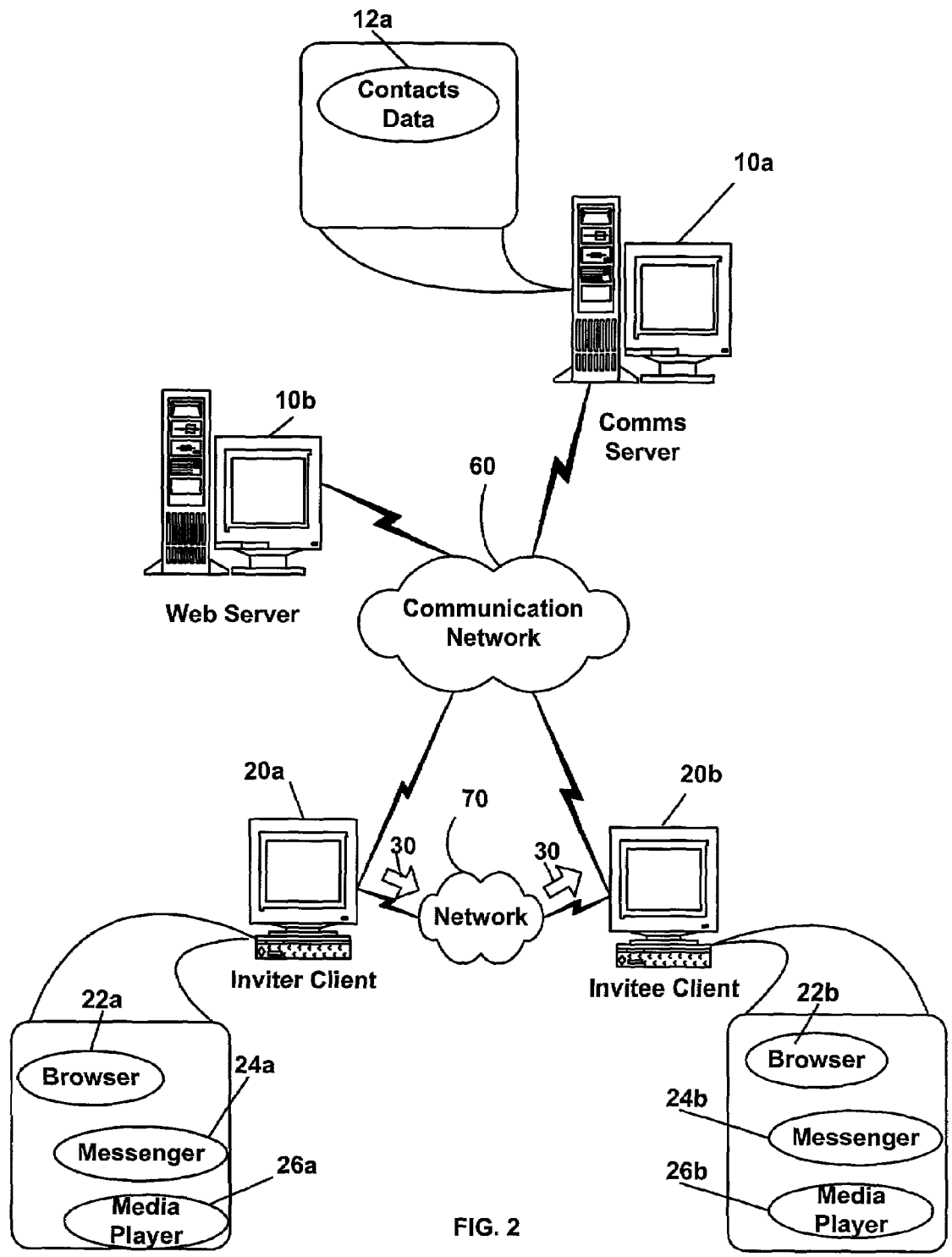
FIG. 2 is a block diagram representing an exemplary network environment having a variety of computing devices in which the present invention may be implemented.

Methods and Systems for Enabling Multiple Online Co-Users to Share Dynamic Content FIG. 2 illustrates an exemplary network environment in which the present invention may be employed. As shown in FIG. 2, a network based communications server 10a and a web server 10b are in communication with client computers 20a, 20b via a communication network 60. It should be understood that any number of servers and clients can be interconnected via the communications network 60. The communication network 60 can be a LAN, WAN, intranet, or the Internet, etc. In a preferred embodiment, the communication network 60 is the Internet. It should further be understood that any number of remote computing devices, or clients, can be interconnected via the communication network 60. The clients 20a, 20b can be, for example, desktop computers, portable computers, handheld computers, thin clients, networked appliances, or other devices, such as VCRs, TVs, and the like. It is thus contemplated that the invention may apply to any computing device in connection with which it is desirable to establish a content sharing session.

In a network environment in which the communication network 60 is the Internet, for example, the servers 10a, 10b can be Web servers with which the clients 20a, 20b communicate via any of a number of known protocols such as hypertext transfer protocol (HTTP). Communications may be wired or wireless, where appropriate. Client devices 20a, 20b may or may not communicate via communications network 60, and may have independent communications associated therewith. For example, in the case of a TV or VCR, there may or may not be a networked aspect to the control thereof. Each client computer 20a, 20b and server computer 10a, 10b may be equipped with various application program modules and with connections or access to various types of storage elements or objects, across which files may be stored or to which portion(s) of files may be downloaded or migrated. Any server 10a, 10b may be responsible for the maintenance and updating of a database or other storage element in accordance with the present invention, such as a database for storing contacts data according to the invention. Thus, the invention can be utilized in a computer network environment having client computers 20a, 20b that can access and interact with a computer network 60, and server computers 10a, 10b that may interact with client computers 20a, 20b and other such devices and databases.

According to the invention, each client computer 20a, 20b can interface with the communication network 60 via a respective browser 22a, 22b. The browser 22a, 22b enables the user at the client 20a, 20b to access certain material on the servers 10a, 10b. Currently, a number of browsers 22a, 22b are commercially available for personal computers and other types of client computers 20a, 20b (such as hand-held computers, palm-sized computers, or any other type of computer that can be used for browsing).

Each client computer 20a, 20b can also include a cookie file (not shown) that includes information the respective clients 20a, 20b need to access certain sites on the servers 10a, 10b. In particular, some Web sites require the client to provide a username and password, for example, before the corresponding server 10a, 10b will download content from the Web site onto the client 20a, 20b. Typically, these username and passwords, along with other access information, such as registration numbers, etc., are included in the client's cookie file. When the user enters a URL for a Web site that requires cookie data, the server 10a, 10b requests the cookie data from the client 20a, 20b. In response, the browser 22a, 22b gathers the required cookie data from the cookie file and provides the cookie data to the server 10a, 10b. Assuming the cookie data is correct, the server 10a, 10b then delivers the content from the Web site to the client 20a, 20b.

As shown in FIG. 2, each client computer 20a, 20b also includes a respective online messenger 24a, 24b via which the user of the computer can access an online message service provided via the communications server 10a. In a preferred embodiment, the communications server is a messenger server includes a data store 12a that contains contacts data used for providing the online message service. A separate contacts file can be maintained for each user that is a subscriber to the online message service. Each contacts file can include contacts data relating to the user's ID and password, the IDs and friendly names of the co-users (i.e., "contacts") that the user has pre-specified for the service. The online message service provides to the user at the inviter client, for example, a contacts list that indicates which, if any, of the pre-specified co-users is currently online. That is, the online message service determines which, if any, of the co-users accounts is currently active by determining whether the co-user has logged into the online message service. The message server also determines an IP address of the computer on which the co-user account is currently active. Typically, a messenger server can only "see" an externally-visible IP address of a client computer. For example, in the case where one user is behind a NAT (network address translator), that computer's actual IP address is different from the one that the messenger server sees. Thus, the online message service "knows" which co-users are currently online, and on what computer they are connected to the network. Accordingly, the online message service can provide this information to the client computers on which the co-user accounts are currently active. Any of the co-users can then initiate an instant message session with any other co-user(s) via the user interface that the online message service provides.

Each client computer 20a, 20b also includes a respective media player 26a, 26b that can be used to provide a dynamic content experience for the user of the computer on which the media player is installed. The term, dynamic content, as that term is used throughout this specification, means digital audio or video.

The media player can be used to play audio or video tracks, which are typically organized into a so-called "playlist" that includes a link to each of the tracks. The tracks are digital files that reside on the computer on which the media player is installed. The user can modify a playlist by adding, sorting, or deleting tracks. The media player typically provides visually appealing displays, based on so-called "skins," to enhance the dynamic content experience. "Skins," as that term is used herein, enable static changes to the UI of the media player itself. The media player can also offer "visualizations," which are dynamic visual representations of the music itself (e.g., wavy lines or the like).

Client 20a is referred to as an inviter client, and client 20b is referred to as an invitee client. For purposes of this specification, the term "inviter" refers to the user that initiates a shared dynamic content experience by offering an invitation to an online co-user to establish the shared experience. The term "invitee" refers to the user that accepts the invitation to establish a shared experience. The terms inviter computer and inviter client refer to the device via which the inviter is communicating with the network. The terms invitee computer and invitee client refer to the device via which the invitee is communicating with the network.

Figure 3:
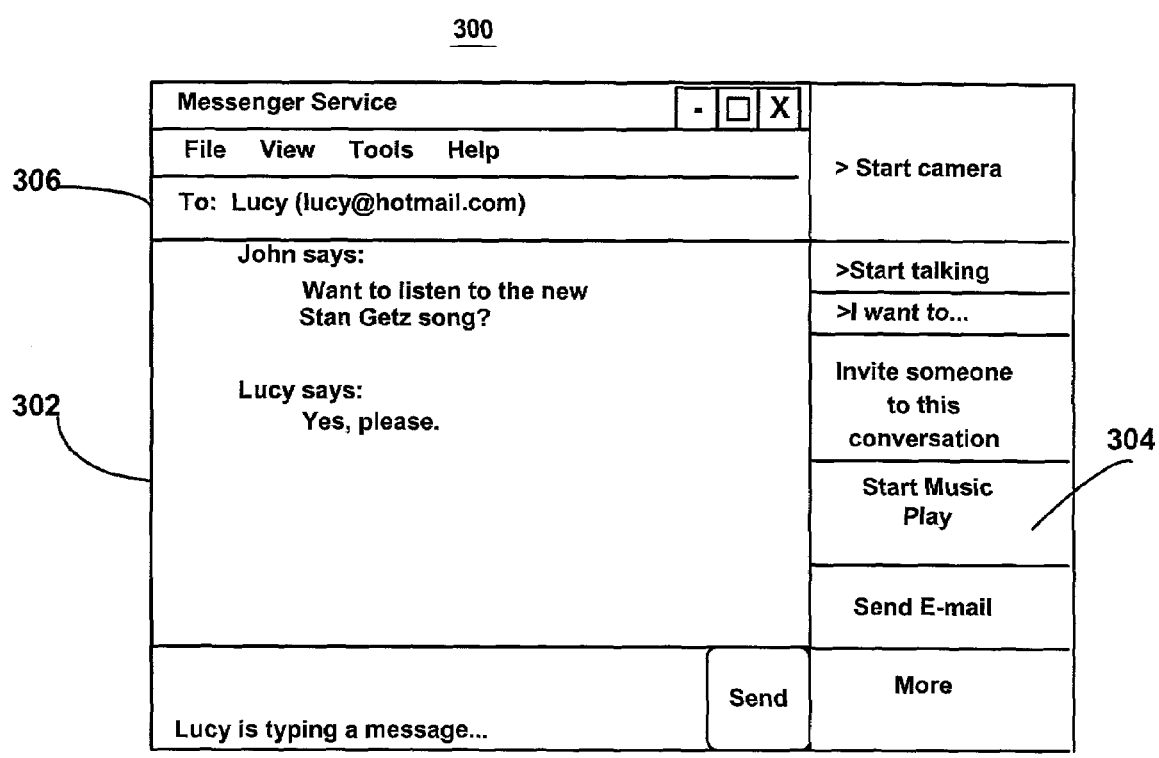
FIG. 3 depicts an exemplary embodiment of an online messenger window according to the invention.

FIG. 3 depicts an exemplary embodiment of an online message window 300 according to the invention. Such an online message window 300 can be provided by an online message service. Such an online message service typically provides a window via which a user can determine whether one or more of a number of pre-specified online co-users is currently online. Such a service also typically enables the online co-users to exchange instant messages.

As shown, the message window 300 can include a conversation window 302 wherein conversations between online co-users can be viewed. That is, as the user of the computer on which the message window 300 is displayed enters the text of a message, the message text appears in the conversation window 302. Similarly, when a message from a remote co-user (with whom the user is currently conversing) is received, the received message text is also displayed in the conversation window 302. Preferably, the message window 300 includes a co-user identification display 306 that can include a pictorial representation of the co-user, the co-user's "friendly name," the co-user's email address, and the like.

According to the invention, the message window 300 can also include a user interface component 304 for initiating a shared audio experience. Preferably, the user interface component 304 includes descriptive text such as "Start Music Play," for example. The inviter can initiate a shared audio experience by selecting the user interface component 304, such as by clicking on the component 304 using the computer's mouse or keyboard.

Figure 4:
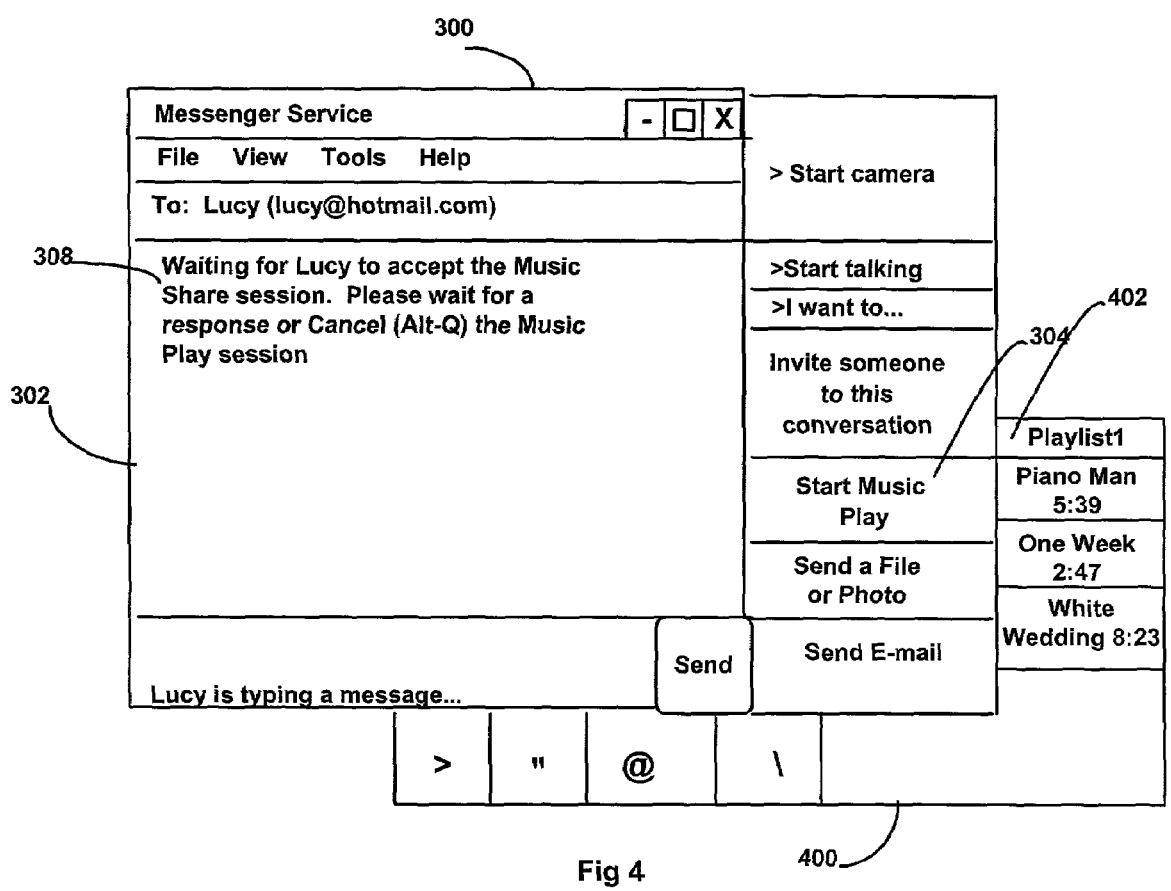
FIG. 4 depicts an exemplary embodiment of an online messenger window according to the invention while an invitation is pending.

FIG. 4 depicts a message window 300 after the inviter has selected the user interface component 304 and attempted to initiate a shared audio session. Preferably, when the inviter selects the "Start Music Play" option, the button 304 is "grayed out." Preferably, because the inviter was engaged in a conversation with a specific online co-user (i.e., "Lucy"), the inviter computer assumes that the inviter wishes to share the audio experience with that online co-user (i.e., that Lucy's computer is the invitee computer). Thus, the inviter computer attempts to establish a connection to the invitee computer (the address of which the online message service knows).

A message 308 can be displayed in the conversation window 302 that indicates that the inviter computer is waiting for the invitee computer to accept the invitation to establish a content sharing session. Meanwhile, if the media player is not already running, the browser can launch the media player in content sharing mode. If the media player is already running, the media player user interface is converted to content sharing mode, but any content that is already playing continues to play uninterrupted. Thus, the inviter can utilize the media player while he is waiting for the invitee to respond.

As shown, the media player can display a playlist 402 that includes a plurality of playlist entries 404 that correspond to respective audio tracks. To listen to a particular track, the user simply clicks on the playlist entry corresponding to that track. The media player then "plays" an audio file associated with the playlist entry. Preferably, the audio files are stored on the inviter computer, though it should be understood that the audio files can be stored remotely from the inviter computer, and retrieved when the user selects them to be played. In a preferred embodiment of the invention, the media player, in content sharing mode, supports the well-known .mp3 and .wma formats.

Preferably, if more than two users are chatting (or if an attempt is made to initiate a shared audio experience from a location other than the messenger window 300), then the inviter computer can provide a user interface via which the inviter can select which of a plurality of pre-specified co-users to invite into a shared audio session.

Figure 5:
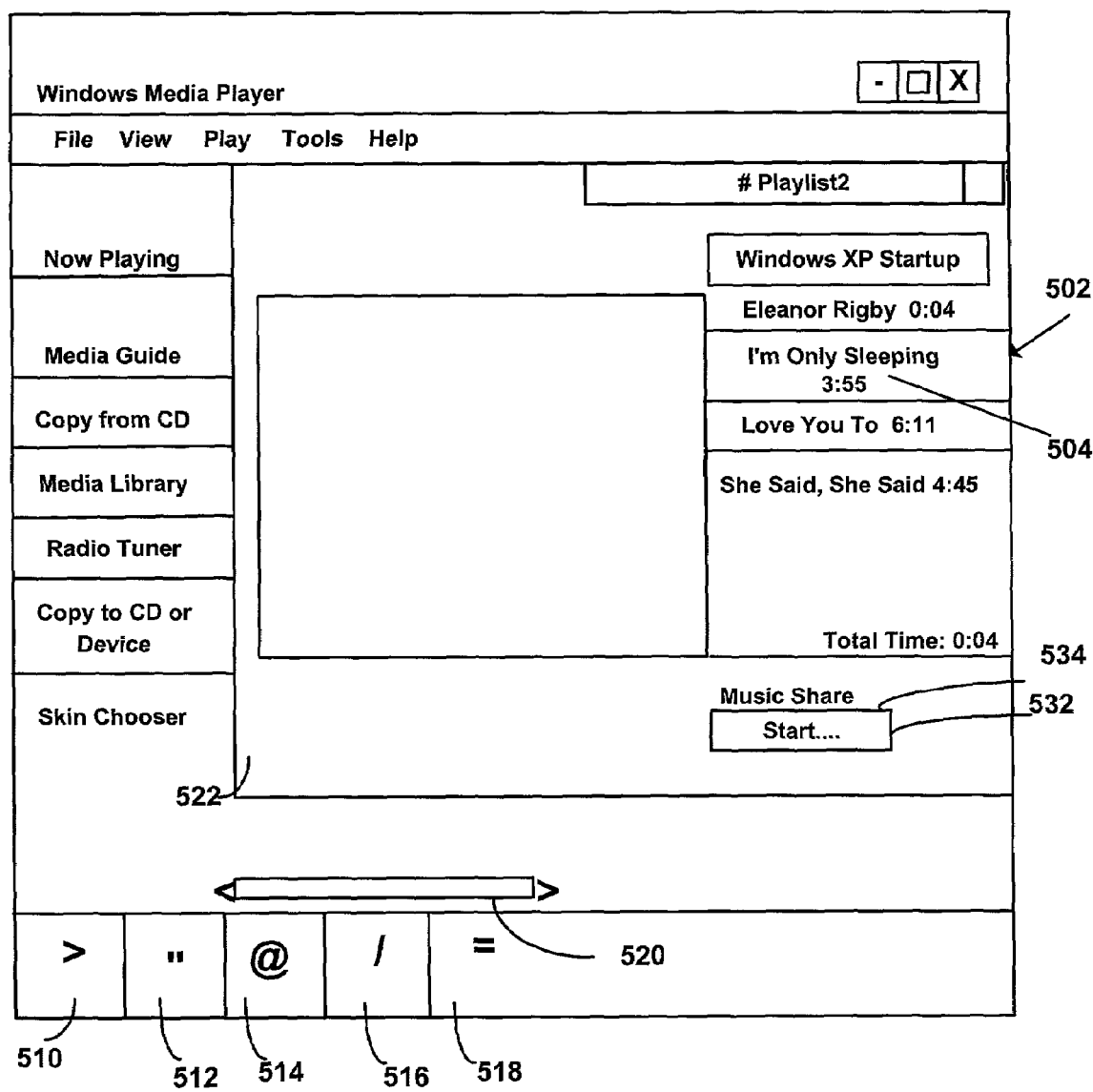
FIG. 5 depicts an exemplary embodiment of a media player window according to the invention.

For example, the inviter can initiate a shared audio session from the media player itself. FIG. 5 depicts a preferred embodiment of a user interface 500 for a media player from which an inviter can initiate a shared audio session. As shown in FIG. 5, the user interface 500 that includes a playlist display 502 via which a list of audio tracks 504 on a particular playlist can be displayed and via which the user can select individual tracks 504 for playing. The media player window 500 also includes user interface components 510-520 for starting the playing of a track, stopping the playing of a track, rewinding a track, fast forwarding a track, and pausing a track. The media player window also includes one or more volume buttons 518. The media player also includes a display area 522 wherein a visual experience can be provided to enhance the audio experience. The visual experience that is provided is based on one or more "visualizations" that are associated with the playlist 502 or with the track 504 that is playing.

According to the invention, the media player can also include a user interface component 530 via which the inviter can initiate a shared audio session. As shown in FIG. 5, the user interface component 530 via which the inviter can initiate a shared audio session can include a "Start" button 532, or the like, and descriptive text 534 such as "Music Share." To initiate a shared audio session, the inviter can simply click on the "Start" button 532.

Figure 6:
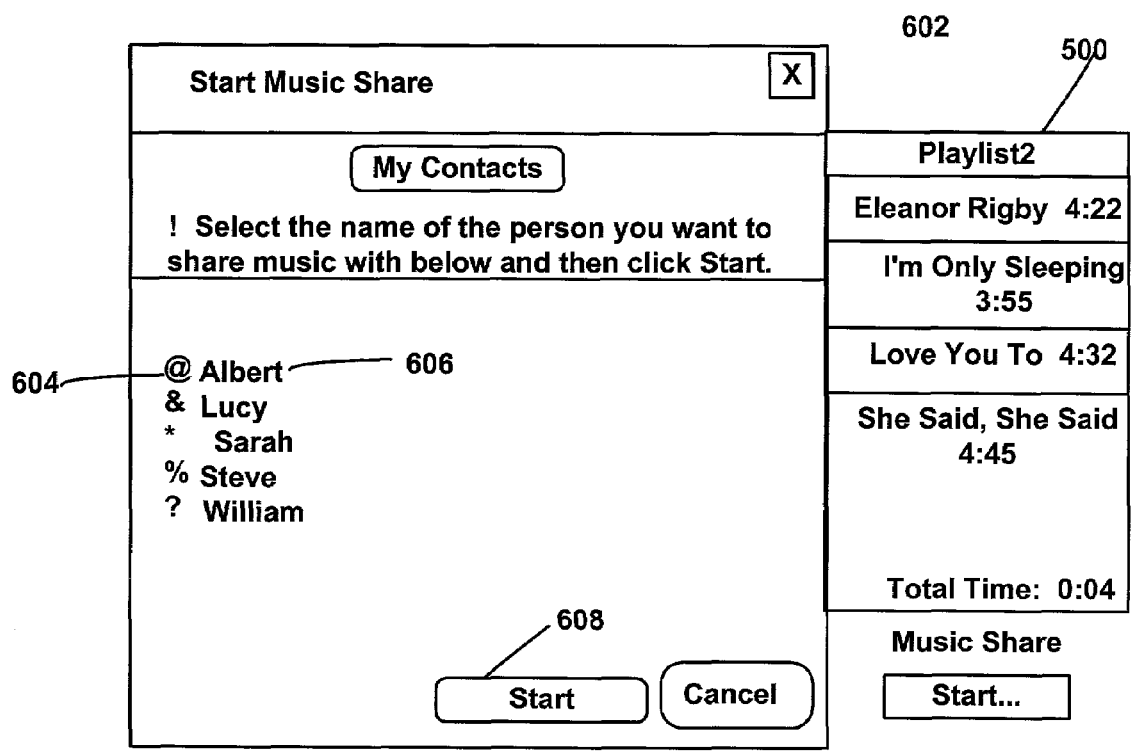
FIG. 6 depicts an exemplary embodiment of a contacts list according to the invention.

Preferably, clicking on the "Start" button 532 from the media player causes a contacts list to be displayed. An exemplary contacts list 602 is depicted in FIG. 6. The contacts list can include a pictorial representation 604 and a friendly name 606 for each of the co-users that the inviter has pre-specified via the online message service. The inviter can then select which of the contacts to invite to share in the audio experience by clicking on the friendly name 606 associated with the invitee contact, and then clicking on the "Start" button 608.

Figure 7:
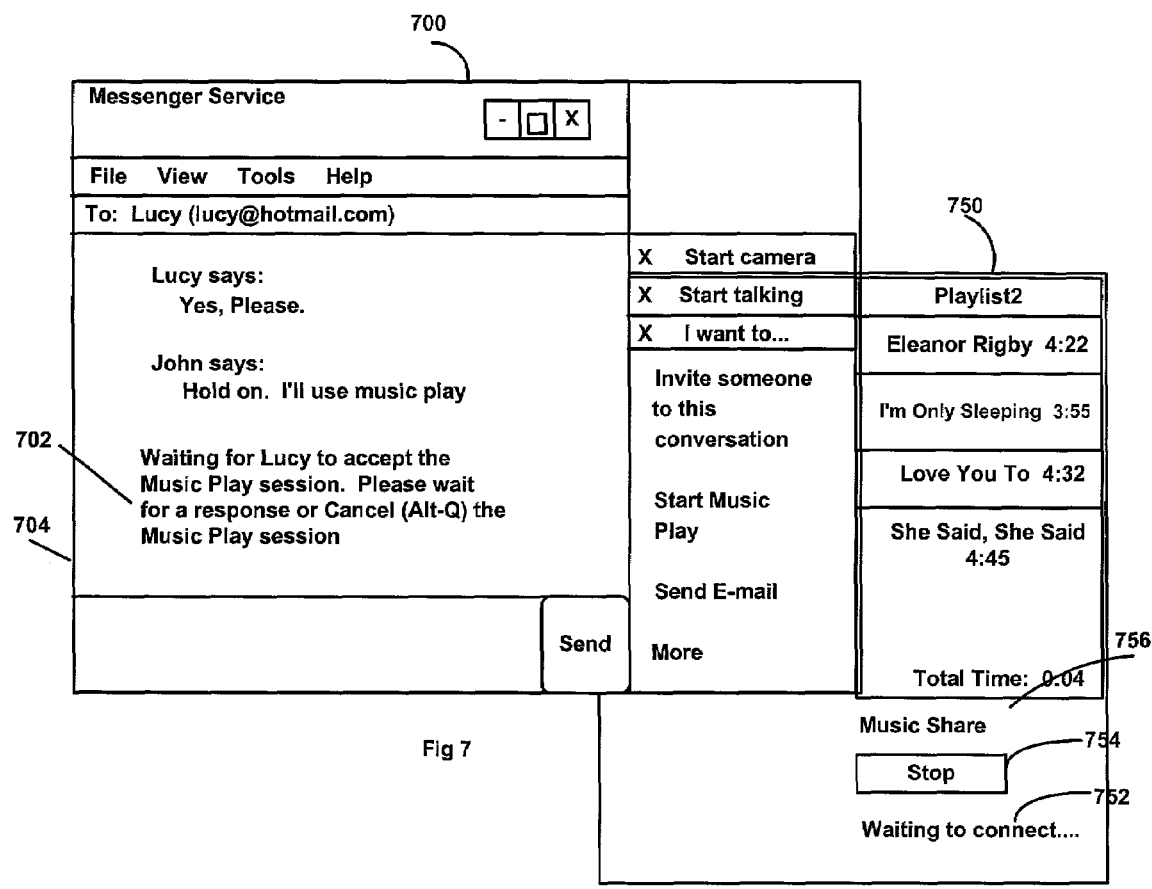
FIG. 7 depicts an exemplary embodiment of an online messenger conversation window according to the invention having a status display for providing connection status of a content sharing session.

In a preferred embodiment of the invention, when the inviter initiates the shared audio session from the media player as described above, the media player causes the online messenger to be launched on the inviter client. FIG. 7 depicts a message window 700 after the inviter has attempted to initiate a shared audio session from the media player. The message window 700 appears, preferably in front of the media player window 750, with a message 702 displayed in the conversation window 704 that indicates that the inviter computer is waiting for the invitee computer to accept the invitation to establish a shared audio session. Meanwhile, as described above, the inviter can continue to utilize the media player while he is waiting for the invitee to respond.

As shown in FIG. 7, the media player can provide a user interface component 752 that indicates that the inviter computer is waiting for the invitee computer to accept the invitation to establish a shared audio session. Preferably, the user interface component 752 includes a text message 754 that indicates that the inviter computer is "waiting to connect" or "waiting for invitation to be accepted." Preferably, the media player also provides a user interface component 756, such as a "Stop" or "Cancel" button, that the inviter can select to cancel the invitation (and thereby stop the connection process) before the invitee accepts.

Figure 8:
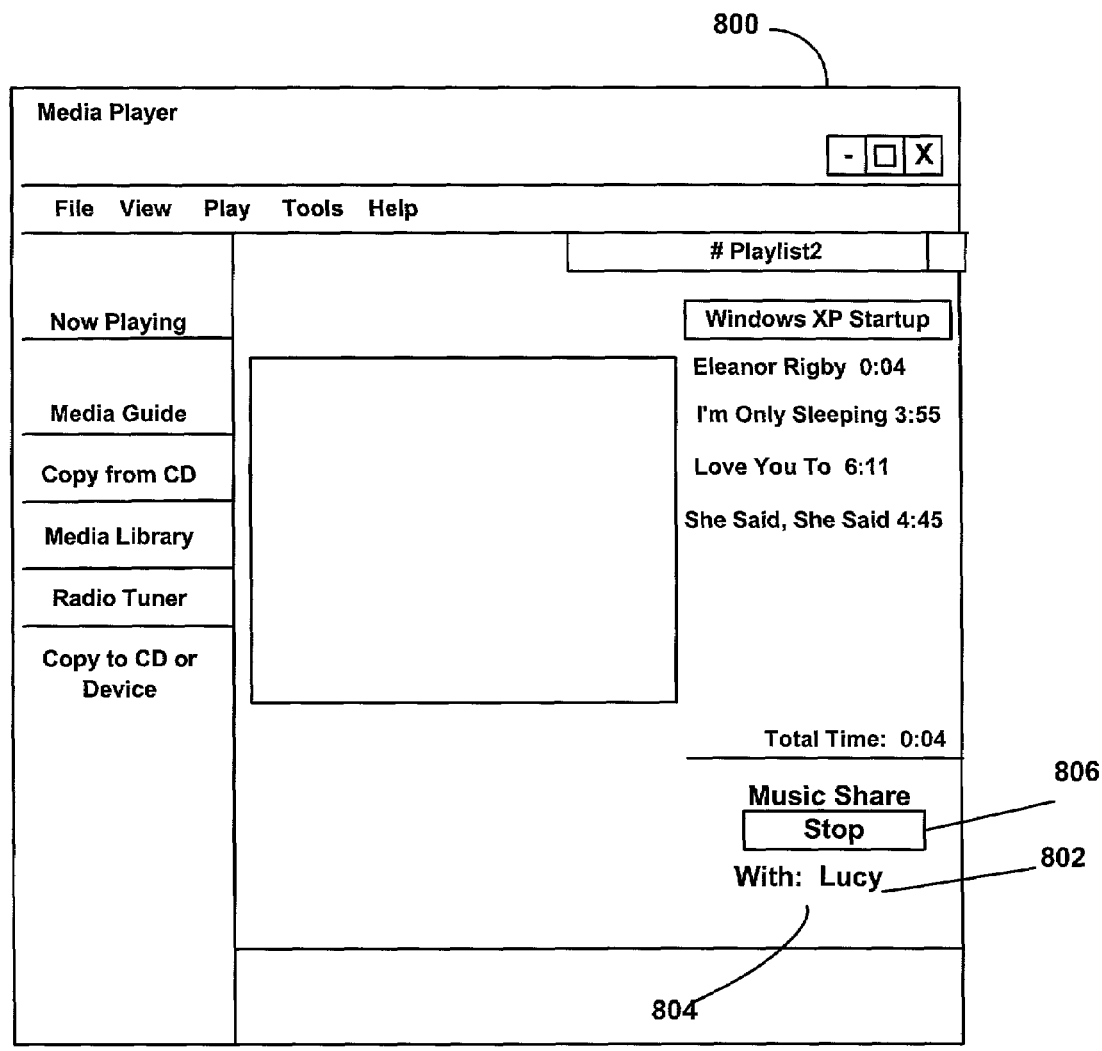
FIG. 8 depicts an exemplary embodiment of a media player window according to the invention having a status display for providing sharing status of a content sharing session.

FIG. 8 depicts a media player window 800 that can be displayed after the shared audio session has been established. Preferably, the media player window 800 includes a user interface component 802 that indicates that the inviter computer has established a shared audio session with the invitee computer. For example, the user interface component 802 can include a text message 804 that indicates that a shared audio session has been established. As shown, the text message 804 can include the friendly name of the online co-user with whom the audio session is being shared. Preferably, the media player window 800 also includes a user interface component 806, such as a "Stop" or "Cancel" button, that the inviter can select to terminate the shared audio session.

Figure 9:
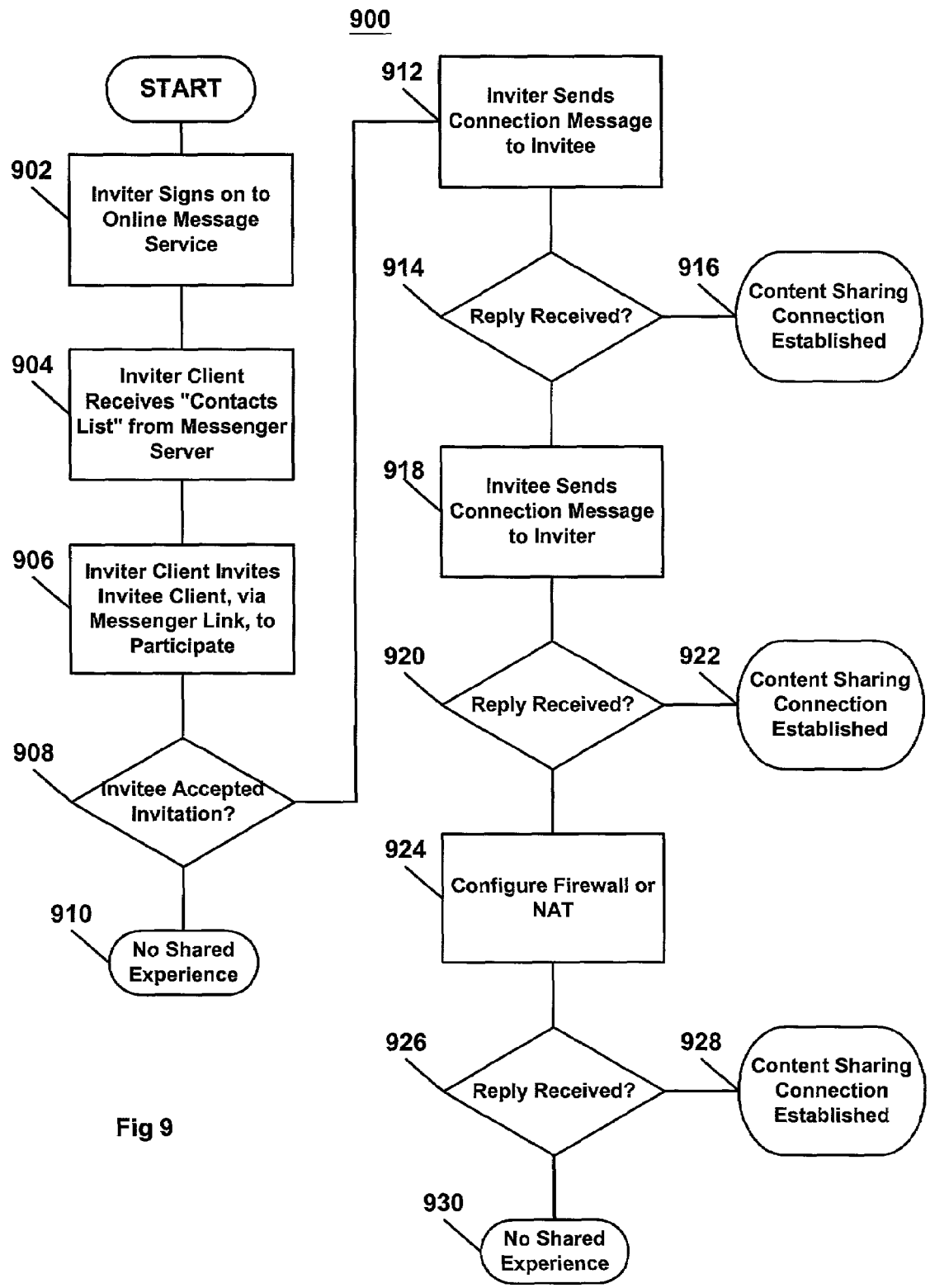
FIG. 9 is a flowchart of a preferred embodiment of a method according to the invention for establishing a shared dynamic content experience among a plurality of online co-users.

FIG. 9 is a flowchart of a method 900 according to the invention for establishing a shared dynamic content experience among a plurality of online co-users. At step 902, the inviter signs on to an online message service, such as the .NET Messenger service, for example, thereby causing the inviter computer to establish a connection, via the communications network, to the online message server. Thus, a first communication path is established, between the inviter computer and the online message service, and can be referred to as an "online messenger communication path." It should be understood, however, that the first communication path can be any connection between the inviter client and the online message service, and need not necessarily be with a Web server.

At step 904, the inviter computer retrieves a list of pre-specified online co-users (i.e., "contacts list") from the online message service. The online co-user list indicates which, if any, of the online co-user accounts that the invitee has pre-specified are currently active. That is, the online co-user list indicates which of the pre-specified co-users are currently online (i.e., also signed in to the online message service). The online co-user list can also include an address, such as an IP address, associated with the respective computers on which the pre-specified co-users are currently logged in. Alternatively, the message service can maintain this address information, but not necessarily provide it to the inviter computer.

Thus, the inviter can then determine whether any of the pre-specified online co-user accounts is currently active on an invitee computer.

At step 906, the inviter selects an option to initiate a shared dynamic content session with one or more of the online co-users in the inviter's contacts list. In a preferred embodiment of the invention, clicking on a contact ID in the contacts list causes a conversation window with that contact to be provided at the inviter computer. As described above, the inviter can initiate a content sharing session by selecting a content sharing option from either a media player window or a messenger window.

In response to inviter's selection of the option to initiate a content sharing session with one or more of the pre-specified online co-users, the inviter computer sends to the invitee computer, via the online messenger communication path, an invitation to establish the content sharing experience between the inviter computer and the invitee computer. Preferably, a text-based formatting language that encapsulates data, such as XML, for example, is used for communications between the client computers over the online messenger path.

It is contemplated that a dynamic content sharing experience among a plurality of online co-users can be implemented as (or as part of) a paid subscription service. In such an embodiment, it would be desirable to enable only a paid subscriber to initiate a content sharing session. To encourage users who wish to use the content sharing service to become paid subscribers, a user interface can be provided to advise the inviter that the capability requested requires a paid subscription. A subscription user interface, via which the inviter can subscribe to the service, can then be offered. Preferably, the subscription user interface provides information about the service and is presented in a way that encourages the user to subscribe. According to the particular embodiment of the invention, a paid subscriber can be enabled to establish a content sharing experience with any online co-user (i.e., any other user that is currently signed into the online message service), or only to those pre-specified co-users that are on the user's contact list.

As described above, when the invitation is sent, a media player window is provided on the inviter's screen with a status area indicating that the invitation is pending, but content playing capability is otherwise fully enabled. If the invitee declines the invitation, the status area can be made to disappear from the media player window at the inviter computer, and the inviter can be notified (preferably, in the conversation window of the messenger window) that the invitation has been declined.

Preferably, the invitation is "brokered" via existing session invite API included in the online message service. That is, the invitee sees the invitation just like any other session invite that the online message service provides. For example, the invitation can be provided via the messenger's conversation window. The invitee can then accept or decline the invitation, thereby causing the invitee computer to send to the inviter computer, via the online messenger communication path, an indication that indicates whether the invitee has accepted or declined the invitation.

If, at step 908, the inviter computer determines that the invitee has declined the invitation, then, at step 910, no content sharing session is established. However, if the inviter computer determines at step 908 that the invitee has accepted the invitation, then the inviter computer attempts to establish a content sharing session on a second, or "content sharing," communication path 30 (see FIG. 2), between the inviter computer and the invitee computer. Preferably, the content sharing communication path includes a peer-to-peer connection between the two clients, and can be based on any protocol that is mutually agreeable to the sharing clients, such as the well-known point-to-point tunneling protocol, for example.

In a first attempt to establish the content sharing communication path, the inviter computer, at step 912, communicates to the invitee computer, via the online messenger communications path, a connection message that identifies an available port of the inviter computer. Thus, the inviter computer can use the online messenger path to establish the content sharing communication path. In such an embodiment, the online message service can provide a relatively small amount of bandwidth for the computers to use in setting up the content sharing path. Additionally, because the clients are hosting online co-users, the online messenger path is a guaranteed path between the clients.

The inviter computer "listens" for a reply message to be received from the invitee computer via the identified port. If, at step 914, a reply is received via the identified port of the inviter computer, then, at step 916, a second communication path is defined between the identified port and the invitee computer, and a content sharing session can begin. Preferably, the reply identifies an available port of the invitee computer and the second communication path is defined between the identified port of the inviter computer and the identified port of the invitee computer. Thus, a content sharing session between the inviter computer and the invitee computer can be established.

If the invitee computer is unable to connect to the available port of the inviter computer at step 914 (because, for example, the inviter computer is behind a NAT or firewall that will not permit a connection based on an incoming request for one), then, at step 918, the invitee computer can send a connection message to the inviter computer via the first communication path. Preferably, the connection message identifies an available port of the invitee computer. In response, the inviter computer sends a reply message to the invitee computer via an available port of the inviter computer. If, at step 920, the invitee computer determines that a reply has been received, then, at step 922, the second communication path is defined between the identified port of the invitee computer and the available port of the inviter computer, and a content sharing session is established.

At step 924, an attempt is made to configure the NAT or firewall to establish a connection between the inviter client and the invitee client. Preferably, a generic protocol, such as Universal Plug and Play (UPNP) can be used. If a reply is received, at step 926, then, at step 928 the second communication path is defined between the identified port of the invitee computer and the available port of the inviter computer, and a content sharing session is established. Thus, a peer-to-peer connection can be made through NATs and firewalls. If, at step 926, a reply is not received, then, at step 930, the system concludes that it is unable to establish a second communication path, and, therefore, unable to establish a content sharing session. Preferably, both the inviter and the invitee are notified that the content sharing session has not been established.

In a preferred embodiment of the invention, a content sharing session can be established for any or all of the following classes of users: modem dial-up users, DSL, cable modem, satellite, multiple users on a home network (e.g., LAN, through a hub at home, etc.), users behind NATs, wireless 802.1x users, and the like.

Assuming that a content sharing communication path can be established between the inviter computer and the invitee computer, a content sharing session can begin. During the content sharing session, information relating to the content sharing experience is communicated between the inviter computer and the invitee computer via the content sharing communications path. That is, the inviter computer communicates to the invitee computer, via the second communication path, information relating to a dynamic content experience at the inviter computer, and receives from the invitee computer, via the second communication path, information relating to a dynamic content experience at the invitee computer. Similarly, the invitee computer communicates to the inviter computer, via the second communication path, information relating to a dynamic content experience at the invitee computer, and receives from the inviter computer, via the second communication path, information relating to a dynamic content experience at the inviter computer.

According to the invention, during a content sharing session, when a track is played, for example, at one co-user's computer, the same track should be played concurrently at the other co-user's computer. That is, when a song begins playing on one user's machine, it should begin playing almost immediately on the other user's machine as well; if one user pauses or skips a song, the same thing should happen on the other user's machine; the co-user's can build a shared playlist together; etc. To establish and maintain synchronization between the clients, a timer is started running on each client when the content sharing path is established. There is a constant absolute difference between the timers on the two clients. Any subsequent action that could potentially have a conflict (i.e., both clients request the same or conflicting actions at different times), gets time stamped before it is sent to the other client. Conflicts can be resolved, therefore, by accounting for the time stamp and difference between the timers.

The information relating to a content sharing experience that is communicated between the inviter computer and the invitee computer can include, without limitation, messages relating to skipping a track, playing, pausing, or stopping playback, inserting a track into the shared playlist, removing a track from the shared playlist, moving a track within the shared playlist, and ending the content sharing session. The information can also include the content itself, as well as any visualizations that are associated with the content and could be used to enhance the media experience. The media player at the computer that receives the information uses the received information to present a dynamic content experience that matches, to the extent possible, the experience at the computer that sent the information. Preferably, the messages between the clients are UTF-8 encoded. It is contemplated that the protocol may be implemented in an XML schema.

Preferably, the dynamic contact can be "transcoded" prior to being sent to the receiving computer to optimize performance for a given bandwidth. The process of "transcoding" can include converting the format and sampling rate of the media file into a format and sampling rate that is more efficient for transmission across the internet. For example, the content can be converted from .mp3 to .wma format, or the bit rate of the data stream can be reduced, or the content can be changed from stereo to mono.

Additionally, to improve the experience, the invention also allows for the media player to begin playing the dynamic media before it is completely downloaded using a process known as "dynamic download." Preferably, the content is transmitted in blocks and stored in virtual memory on the receiving machine. The media player on the receiving machine determines when to begin playing the track. This determination is made based on how much of the track has been downloaded to the receiving machine, and how fast it is being downloaded, so that the media player does not start playing until it is relatively sure that it will be able to play the whole track. It should be understood that the media player could simply wait until the whole track is in its virtual memory to begin playing it. For aesthetic reasons, however, the media player in a preferred embodiment does not wait until the whole track is received to being playing.

It should also be understood that a typical media player receiving content from a network bases source does so according to a "pull" model. That is, the media player "pulls" the content from the network based source. In a system according to the invention, the sending client is "pushing" the data to the receiving client. Consequently, the data is stored in virtual memory on the receiving machine so that the media player on the receiving machine can "pull" the content from its virtual memory at whatever rate it determines it can pull the data.

A preferred implementation of a typical content sharing message that is communicated via the content sharing communication path between the inviter client and the invitee client can have the following structure: content-type:message/sharedcontent/<action>content-length:<length><payload>, where "action" specifies the type of message, "length" specifies the size (in bytes) of the payload, and "payload" contains information specific to the action. Messages corresponding to the following actions can be communicated between sharing clients in a preferred embodiment of a system according to the invention.

A "request" action can be sent before content is sent for a given file. This action is basically a header for the content itself. The payload for a request action can include: the size of the content file, the file name, a timestamp for the message, a unique identifier for the file, the duration of the file, and a flag that indicates whether the sending of the file should be "forced."

In a preferred embodiment of the invention, content is cached in virtual memory on the receiving machine. To limit the amount of memory required for storing the content, and the amount of traffic between the machines, each machine "knows" which tracks are currently stored on the other machine. Consequently, if the co-users elect to replay, for example, a track that is currently in cache, the sending machine "realizes" that the track is stored in the receiving machine's cache, and that it need not retransmit the track. It is expected, however, that the state between machines will sometimes be inconsistent. That is, sometimes the sending machine will "think" that a particular track is stored in the receiving machine's cache when it is not. In such a situation, the sending machine will not resend the track. In a preferred embodiment of the invention, however, the receiving machine is enabled to "force" the sending machine to send the track again. To do so, the receiving machine sends a request action to the sending machine with the force flag set to indicate that the track should be sent regardless of the sending machine's "belief" that the track is already in the receiving machine's cache.

A "skip" action can be sent whenever a track skip occurs. This can also precede sending of content. The payload for a skip action can include: the size of the content file, the file name, a timestamp for the message, a unique identifier for the file, the duration of the file, and a flag that indicates whether the sending of the file is forced.

A "data" action can be used to send blocks of data. The receiving client can save such blocks in memory and pass them off to the media player. The payload for a data action can include binary content data. Preferably, the data file is a .wma file or .wmv file that contains an encoded, compressed version of the dynamic content.

A "last" action denotes the last block of content data. The receiving client can save these blocks in memory and pass them off to the media player. The payload for a last action can include binary content data.

A "play" action can be sent whenever a notification is received that dynamic content has started playing. The payload for a play action can include: a unique identifier for the content to play, a file name, a flag that indicates whether to reset back to the beginning of the track when starting playback, and a timestamp of the action. Playback begins on the receiving client if the media player on the receiving client determines that the timestamp is valid.

A "pause" action can be sent whenever a notification is received that playback has been paused. The payload for a pause action can include a timestamp for the action. Playback is paused on the receiving client if the media player on the receiving client determines that the timestamp is valid.

A "stop" action can be sent whenever a notification is received that playback has been stopped. The payload for a stop action can include a timestamp for the action. Playback is stopped on the receiving client if the media player on the receiving client determines that the timestamp is valid.

A "firstinsert" action can be sent whenever a notification is received that the first item in a playlist has been added. The payload for a "firstinsert" action can include: the size of the content file, the file name, a timestamp for the action, a unique identifier for the file, the duration of the file, a unique identifier for the item that precedes the item inserted (<null>, if none), a unique identifier for the item that follows the item inserted (0, if none), and a file name for the content item that follows the item inserted (<null>, if none). If the media player on the receiving client determines that the timestamp is valid, the first item can be added into the playlist on the receiving client.

An "insert" action can be sent whenever a notification is received that an item has been added to the playlist. The payload for an "insert" action can include: the size of the content file, the file name, a timestamp for the action, a unique identifier for the file, the duration of the file, a unique identifier for the item that precedes the item inserted (0, if none), a file name for the content item that precedes the item inserted (<null>, if none), a unique identifier for the item that follows the item inserted (0, if none), and a file name for the content item that follows the item inserted (<null>, if none). If the media player on the receiving client determines that the timestamp is valid, the new track can be inserted into the playlist on the receiving client.

A "remove" action can be sent whenever a notification is received that an item has been removed from the playlist. The payload for a "remove" action can include: a unique identifier for the file, and the file name. If the media player on the receiving client determines that the timestamp is valid, the track can be removed from the playlist on the receiving client.

A "move" action can be sent whenever a notification is received that the user has changed the position of an item in the playlist. The payload for a "move" action can include: the size of the content file, the file name, a timestamp for the action, a unique identifier for the item, a unique identifier for the item that precedes the item inserted (0, if none), a file name for the content item that precedes the item in its new position (<null>, if none), a unique identifier for the item that follows the item in its new position (0, if none), and a file name for the content item that follows the item in its new position (<null>, if none). If the media player on the receiving client determines that the timestamp is valid, the track can be moved within the playlist on the receiving client.

An "end" action can be sent to end the content sharing session on the co-user's client computer. The payload for an end action can include a string that indicates why the session was ended.

Preferably, for the action messages described above, flags are either 0 or nonzero, timestamps are 32 bit numbers, the size of the content file is a 32 bit number (in the case of a network file, the size is 0), and the duration of the content file is sent as a 32 bit number representing the time in ms.

Preferably, the inviter can begin to build a shared playlist in the media player as soon as he initiates an invitation to the invitee. The shared playlist can be pre-filled with songs that are currently in the inviter's playlist. Additionally, if the inviter was listening to music, for example, at the time he initiated the invitation, the media player at the inviter computer should continue to play the music seamlessly until the invitee accepts the invitation. At that time, the playlist on the inviter client is replicated on the invitee client and the music that was playing on the inviter client stops so that progressive downloading and buffering can begin with the first song in the shared playlist. Preferably, if there is no current playlist, a playlist builder interface, via which the user can start to build a playlist, is opened automatically.

Preferably, when a content sharing experience is established, the media players at each of the inviter client and the invitee client run in "shared mode." In a preferred embodiment, when the invitation to share dynamic content is accepted, the media player on the invitee client is stopped, if it is running, and replaced with a media player window in shared mode, with the shared playlist being displayed. If the media player is not running when the invitation is accepted, the media player is launched in shared mode. The invitee is then enabled to use the media player in shared mode.

In shared mode, the media players display the shared playlist. Additionally, the media player can include a status indicator that indicates the current sharing status (e.g., "shared playlist with [online contact]"). Throughout the content sharing session, each co-user can be provided with options to add, remove, and shuffle songs as soon as the respective media player is launched. Consequently, the inviter can start utilizing the media player in shared mode while waiting for the invitee to accept the invitation. When either user adds a song to the playlist, the media players at both clients update their respective shared playlists. Tracks can be listed in the shared playlist by title, length (e.g., minutes:seconds), and which co-user owns each track. The shared playlist within the media player can provide a display that indicates which tracks belonged to which co-user by using different colors for the text that represents the tracks in the playlist. The shared playlist can also provide user interface components that enable the user to add a song to the play list, remove a song from the playlist, and to sort the order of the songs in the playlist.

Figure 10A:
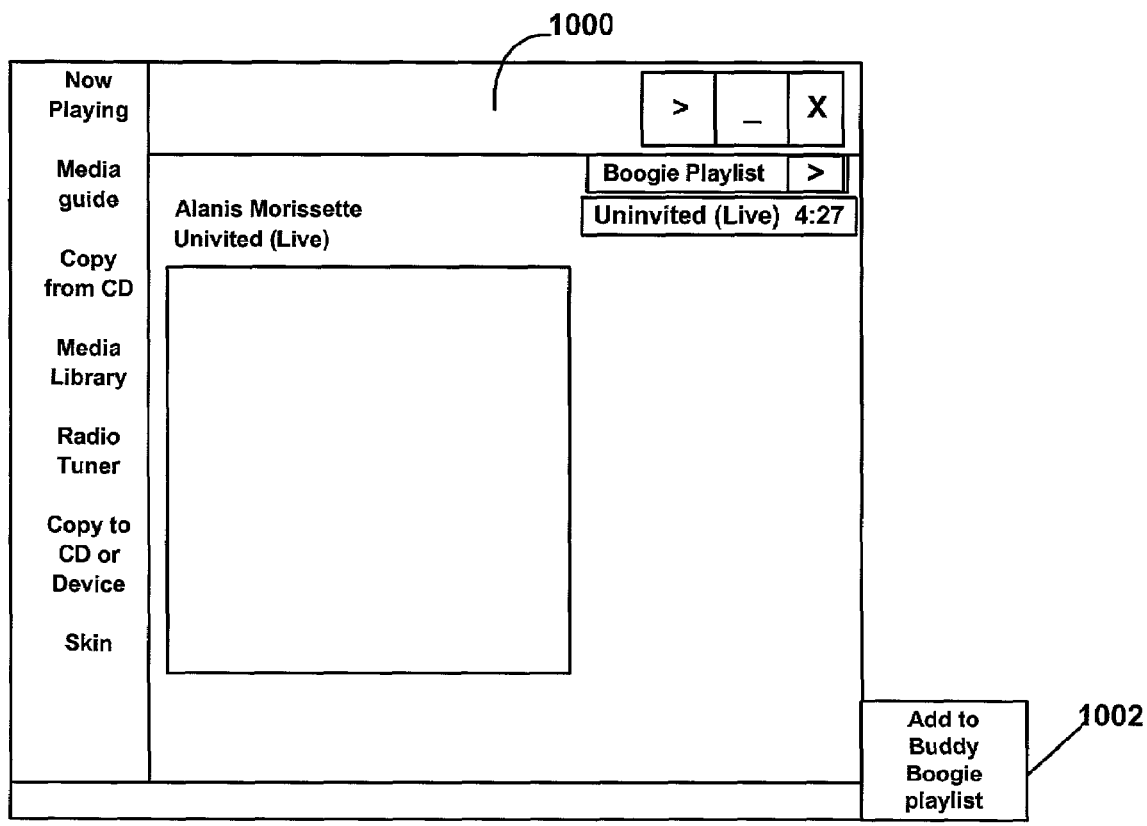
FIGS. 10A and 10B depict an exemplary embodiment of a media player window according to the invention having an option to add a track to a shared playlist.
Figure 10B:
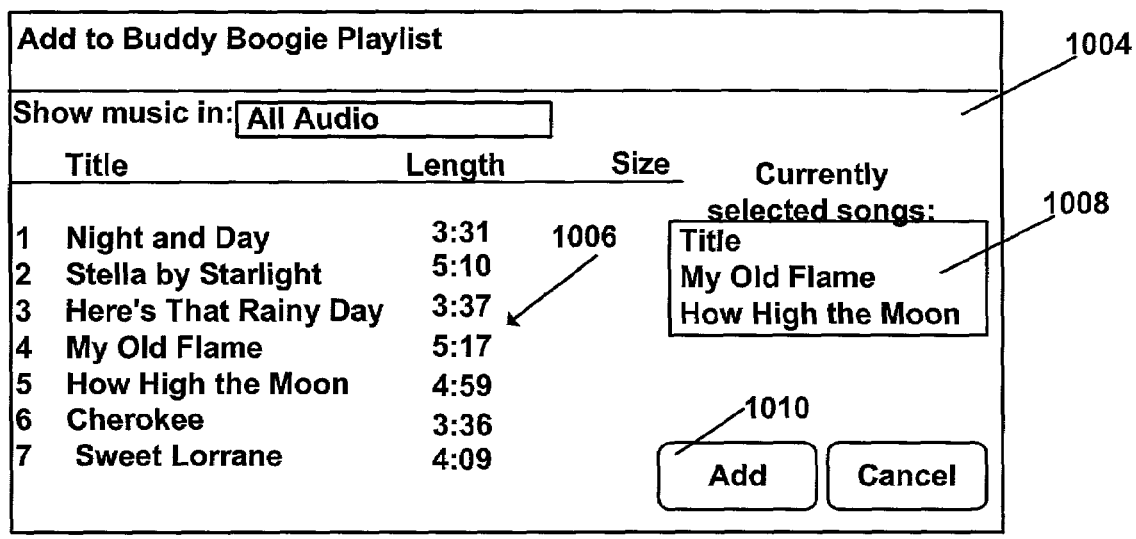

FIGS. 10A and 10B depict an exemplary embodiment of a media player window according to the invention having an option to add a track to a shared playlist. As shown in FIG. 10A, the media player window 1000 can include a user interface component 1002, such as a pull down menu, via which the user can select an option to add a track, by clicking on text associated with the option, for example.

After the user selects the option to add a track, the media player can provide a user interface 1004, as shown in FIG. 10B, that includes a list of tracks 1006 from which the user can select one or more tracks to add to the shared playlist. The user interface 1004 can also include a selected tracks list 1008 that provides a list of tracks that have been selected to be added to the shared playlist. The user can select the "Add" button 1010 to cause the tracks to be added to the shared playlist.

Preferably, either user can add a track to the shared playlist at any time. When one user adds a track, the track is added to the other user's playlist as well. In a preferred embodiment, each track can have a unique numerical identifier that is generated as a rolling index (which, in general, will be different on different clients). The rolling index enables the media player to determine if a user has added the same song to the playlist more than once.

The foregoing user interface is provided as an example of a user interace that can be provided according to the invention for enabling an online co-user to manipulate a shared playlist. It should be understood that user interfaces that enable the online co-users to use any functionality of the media players in a shared experience can similarly be provided. For example, in a preferred embodiment, a user interface can be provided that enables either user to re-order the songs on the shared playlist. Preferably, the order of songs on the shared playlist is maintained to be identical on both clients. Similarly, when either user skips a track, the media players at both clients skip the track.

If a user selects a different playlist, then the newly selected playlist becomes the shared playlist. The tracks that formed the old shared playlist can be replaced with the tracks that form the new shared playlist. The name that the media player displays for the playlist (e.g., "Shared playlist with [co-user's friendly name]") can remain. If a user tries to change the shared playlist, a warning dialog can be provided to determine whether the user would like to replace the entire current shared playlist and share the new one instead. The user can cancel or confirm the request to change the playlist. If the request is canceled, the current playlist remains, and the track that is currently playing continues to play. If the request is confirmed, the track that is currently playing is stopped, the shared playlist is replaced on each user's computer, and the first track in the new playlist is started.

Preferably, when a track is played, enough of the digital data corresponding to the track is buffered to ensure smooth playing of the content. Accordingly, when a track is played, an indication can be provided at each client computer that indicates which track is being played, along with its buffering status. As soon as a sufficient quantity of data is buffered on each co-user's computer, the track is played on both co-user's computers.

Preferably, remote content can be shared just like any other content, however, in a preferred embodiment, both clients can stream directly from the source. That is, the stream is not sent from one client to the other.

When the playlist is complete or empty (if a user has removed all of the songs, for example), then the media player stops playing. The co-users can remain connected via the content sharing communication path, however. That is, the content sharing session will remain active. If a user proceeds to add a song, the song will be added to both users' playlists. Similarly, a user could chose to start the shared playlist over, pick another playlist, etc.

To avoid violating any rights in the dynamic content, it is preferred that the shared playlist cannot be saved, nor any song received from a sharing client. Additionally, DRM music can be "hard-blocked." That is, a DRM song will not be played while the media player is in shared mode. If the media player in shared mode detects that a track corresponds to a DRM song, the media player can be made to automatically skip to the next playable song, and provide a dialog explaining why the track was skipped.

Figure 11:
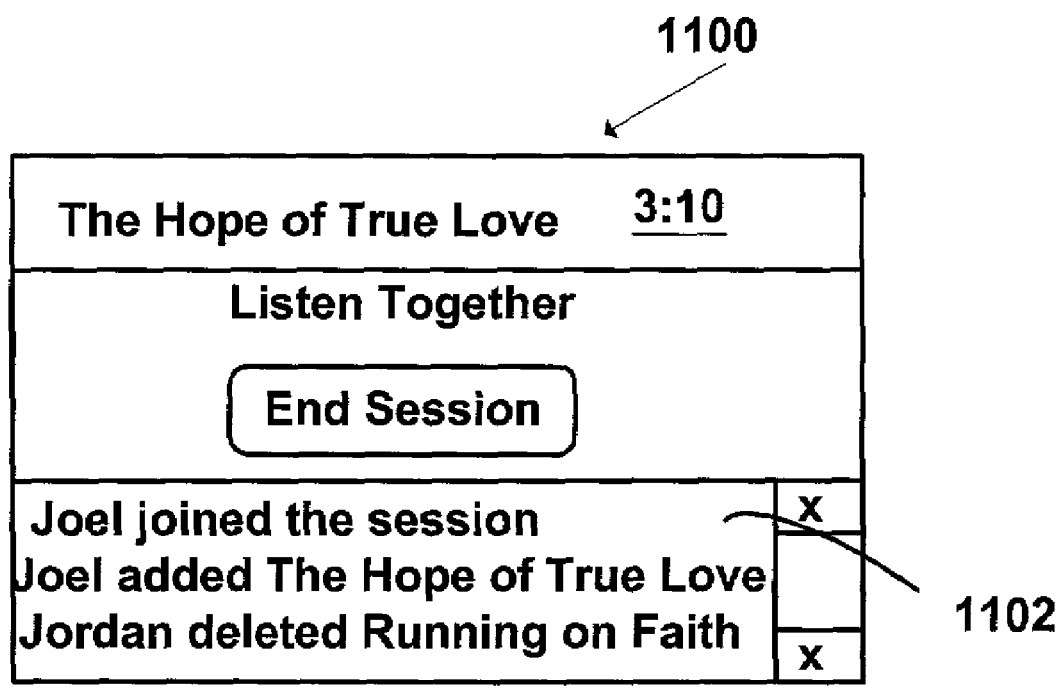
FIG. 11 depicts a status display according to the invention for providing status of a shared dynamic content experience.

FIG. 11 depicts an exemplary status display that can be provided in a messenger window according to the invention for providing session status associated with a content sharing session. As shown, the messenger window 1100 can include an integrated status display window 1102 wherein a text message can be displayed to provide an indication that a certain event has occurred. For example, as shown in FIG. 11, the status display can provide a text message 1104 that indicates that the system is waiting for a remote co-user to join the content sharing session. Additionally, the status display can provide text messages that indicate that a remote co-user has joined the session, ended the session, added a track, removed a track, skipped a track, changed the playlist order, paused playing, stopped playing, restarted playing, changed playlists, or the like.

In addition to providing session status via the media player window, status can also be provided via the messenger conversation window. For example, the conversation window can display a text message that indicates which track is currently playing, that identifies the next track in the playlist, that indicates that a remote co-user has added a track to the shared playlist, or the like. A link from the messenger window to the media player can be provided to enable the user to jump to the media player to edit the shared playlist, for example.

In a preferred embodiment of the invention, only one content sharing session can be established on a particular computer at a time. Thus, if a user tries to initiate another invitation to share a dynamic content experience while he is already engaged in a content sharing experience (or has a prior invitation is pending), an error message is displayed to inform him that he already has a content sharing session with another co-user. The error message could enable him to end that session and start the new one. Similarly, if a user receives an invitation to share in a dynamic content experience while she is already engaged in a content sharing experience (or has a prior invitation pending), then the new invitation is not displayed at the user's computer. Rather, the invitation is automatically declined, and an error message is provided at the latter inviter's computer to explain that the would-be invitee is already participating in a content sharing session.

Either user can terminate a content sharing session by selecting an "end session" button, for example, in the media player window. Preferably, at the end of a content sharing session, the status bar disappears for the user who terminated the session. For the other user, the status bar preferably indicates that the first user has ended the content sharing session. The user who did not terminate the session can then be provided with several options. For example, the user can be enabled to "re-invite" the terminating co-user back into a content sharing session. If it is not possible to re-invite the terminating co-user (e.g., if the terminating co-user is no longer online), then this option need not appear.

When a co-user exits a content sharing session, that user's tracks disappear from the other users' playlist. The media player on the other users' computers, however, continue to play the content that remains in their playlists. For example, if User A ends a content sharing session with User B in the middle of a track that is stored on User A's computer, then the track will stop playing immediately on User B's computer, and the media player on User's B's computer will skip to the next track in User B's playlist that is stored on User B's computer. Preferably, the status area on User A's media player window disappears, and User B's computer displays a notification in the status area that indicates that the content sharing session has ended.

Preferably, if one of the co-users closes the media player, then the content sharing session is terminated. The status display at the other co-user's computer can provide an indication that the terminating co-user has terminated the content sharing session.

Thus, there have been described systems and methods for enabling a plurality of online co-user's to establish and share a common dynamic content experience. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

The invention claimed is:

1. A method for providing a shared dynamic content experience, the method comprising:
   determining from an online message service whether an online co-user account is currently active;
   retrieving from the online message service, an address associated with an invitee computer associated with the online co-user account;
   establishing a communication path between an inviter computer and the invitee computer;
   communicating, via the communication path to the invitee computer, information relating to a dynamic content experience at the inviter computer;
   receiving via the communication path, information relating to a current audio experience at the inviter computer, wherein the information relating to the current audio experience at the inviter computer comprises information that pertains to utilizing a playlist with a link to each of a plurality of tracks, each track comprising a digital audio file resident on the inviter computer;
   receiving a selection of one of the plurality of tracks by way of a selection of the corresponding link in the playlist; and
   transcoding the audio file of the selected track at the inviter computer in accordance with information relating to the communication path, and only if one of (a) the audio file is not protected by a rights-management system at the inviter computer and (b) the audio file is protected by a rights-management system at the inviter computer and the rights-management system determines that the audio file can be transcoded, the transcoding comprising converting at least one of a format and a sampling rate of the audio file into a format and/or sampling rate that is efficient for transmission via the communications path.

2. The method of claim 1, further comprising:
   communicating to the inviter computer, via a communication path associated with the online message service, an invitation to establish a shared audio experience between the inviter computer and the invitee computer.

3. The method of claim 1, further comprising:
   receiving from the inviter computer, via a communication path associated with the online message service, an acceptance of an invitation to establish a shared audio experience between the inviter computer and the invitee computer.

4. The method of claim 1, further comprising:
   initiating at the inviter computer a media player that is adapted to process audio files.

5. The method of claim 1, further comprising:
   initiating at the inviter computer a network browser via which a communication path between the inviter computer and the online message service can be established.

6. The method of claim 1, wherein utilizing the playlist comprises at least one of loading the playlist, adding a track to the playlist, removing a track from the playlist, moving a track within the playlist, sorting tracks within the playlist, and clearing the playlist.

7. The method of claim 1, wherein communicating the information relating to the audio experience at the inviter computer comprises communicating information that pertains to at least one of starting, playing, pausing, stopping, and skipping an audio track.

8. A method for establishing a shared dynamic content experience, the method comprising:
   receiving from an invitee computer, via a first communication path between an inviter computer and a network based communications server, an acceptance of an invitation to establish a shared dynamic content experience between the inviter computer and the invitee computer;
   establishing a second communication path between the inviter computer and the invitee computer;
   communicating to the invitee computer, via the second communication path, information relating to a dynamic content experience at the inviter computer, wherein the information includes information related to a playlist;
   receiving from the invitee computer, via the second communication path, information relating to a current audio experience at the invitee computer, wherein the information relating to the current audio experience at the invitee computer comprises information that pertains to utilizing a playlist with a link to each of a plurality of tracks, each track comprising a digital audio file resident on the invitee computer;
   receiving a selection of one of the plurality of tracks by way of a selection of the corresponding link in the playlist; and
   transcoding an audio file at the invitee computer in accordance with information relating to the second communication path, and only if one of (a) the audio file is not protected by a rights-management system at the invitee computer and (b) the audio file is protected by a rights-management system at the invitee computer and the rights-management system determines that the audio file can be transcoded, the transcoding comprising converting at least one of a format and a sampling rate of the audio file into a format and/or sampling rate that is efficient for transmission via the second communications path.

9. The method of claim 8, further comprising:
   receiving via the first communication path, an address associated with the invitee computer and an indication that an online co-user account is currently active on the invitee computer.

10. The method of claim 8, further comprising:
    sending to the invitee computer, via the first communication path, the invitation to establish the shared dynamic content experience between the inviter computer and the invitee computer.

11. The method of claim 8, wherein establishing the second communication path comprises:
    communicating a connection message to the invitee computer via the first communication path;
    determining whether a reply from the invitee computer has been received; and
    if a reply is received from the invitee computer, defining the second communications path to be established between the inviter computer and the invitee computer.

12. The method of claim 8, wherein establishing the second communication path further comprises:
    receiving a connection message from the invitee computer via the first communication path;

sending a reply message to the invitee computer; and defining the second communication path to be established between the invitee computer and the inviter computer.

13. A method for establishing a shared dynamic content experience, the method comprising:

receiving from an inviter computer, via a first communication path between an invitee computer and a network based communication server, an invitation to establish a shared dynamic content experience between the inviter computer and the invitee computer;

establishing a second communication path between the inviter computer and the invitee computer;

communicating to the inviter computer, via the second communication path, information relating to a dynamic content experience at the invitee computer, wherein the information includes information related to a playlist;

receiving from the inviter computer, via the second communication path, information relating to a current audio experience at the inviter computer, wherein the information relating to the current audio experience at the invitee computer comprises information that pertains to utilizing a playlist with a link to each of a plurality of tracks, each track comprising a digital audio file resident on the invitee computer;

receiving a selection of one of the plurality of tracks by way of a selection of the corresponding link in the playlist; and transcoding an audio file at the invitee computer in accordance with information relating to the second communication path, and only if one of (a) the audio file is not protected by a rights-management system at the invitee computer and (b) the audio file is protected by a rights-management system at the invitee computer and the rights-management system determines that the audio file can be transcoded, the transcoding comprising converting at least one of a format and a sampling rate of the audio file into a format and/or sampling rate that is efficient for transmission via the second communications path.

14. The method of claim 13, further comprising:

sending to the inviter computer, via the first communication path, an acceptance of the invitation to establish the shared dynamic content experience between the inviter computer and the invitee computer.

15. The method of claim 13, further comprising:

receiving from the inviter computer, via the second communication path, information relating to a dynamic content experience at the inviter computer.

16. The method of claim 13, wherein establishing the second communication path comprises:

receiving a connection message from the inviter computer via the first communication path; and communicating to the inviter computer via the second communications path a reply to the connection message.

17. The method of claim 13, wherein establishing the second communication path further comprises:

communicating a connection message from the invitee computer to the inviter computer via the first communication path;

determining whether a reply message from the inviter computer has been received; and defining the second communication path to be established between the invitee computer and the inviter computer.

18. A computer storage medium storing thereon computer instructions for performing the following method for establishing a shared dynamic content experience, the method comprising:

determining from an online message service whether an online co-user account is currently active;

retrieving from the online message service, an address associated with an invitee computer associated with the online co-user account;

establishing a communication path between an inviter computer and the invitee computer;

communicating, via the communication path to the invitee computer, information relating to a dynamic content experience at the inviter computer, wherein the information includes information related to a playlist;

receiving via the communication path, information relating to a current audio experience at the inviter computer, wherein the information relating to the current audio experience at the inviter computer comprises information that pertains to utilizing a playlist with a link to each of a plurality of tracks, each track comprising a digital audio file resident on the inviter computer;

receiving a selection of one of the plurality of tracks by way of a selection of the corresponding link in the playlist; and transcoding the audio file of the selected track at the inviter computer in accordance with information relating to the communication path, and only if one of (a) the audio file is not protected by a rights-management system at the inviter computer and (b) the audio file is protected by a rights-management system at the inviter computer and the rights-management system determines that the audio file can be transcoded, the transcoding comprising converting at least one of a format and a sampling rate of the audio file into a format and/or sampling rate that is efficient for transmission via the communications path.

19. The computer storage medium of claim 18, the method further comprising:

receiving via the communication path, information relating to a current audio experience at the invitee computer.

20. The computer storage medium of claim 18, the method further comprising:

communicating to the inviter computer, via a communication path associated with the online message service, an invitation to establish a shared audio experience between the inviter computer and the invitee computer.

21. The computer storage medium of claim 18, the method further comprising:

receiving from the inviter computer, via a communication path associated with the online message service, an acceptance of an invitation to establish a shared audio experience between the inviter computer and the invitee computer.

22. The computer storage medium of claim 18, the method further comprising:

initiating at the inviter computer a media player that is adapted to process audio files.

23. The computer storage medium of claim 18, the method further comprising:

initiating at the inviter computer a network browser via which a communication path between the inviter computer and the online message service can be established.

24. The computer storage medium of claim 18, the method further comprising:

processing an audio file at the inviter computer in accordance with the information relating to the audio experience at the invitee computer.

25. The computer storage medium of claim 18, wherein communicating the information relating to the audio experience at the inviter computer comprises communicating information that pertains to utilizing a playlist.

26. The computer storage medium of claim 25, wherein utilizing the playlist comprises at least one of loading the playlist, adding a track to the playlist, removing a track from the playlist, moving a track within the playlist, sorting tracks within the playlist, and clearing the playlist.

27. The computer storage medium of claim 18, wherein communicating the information relating to the audio experience at the inviter computer comprises communicating information that pertains to at least one of starting, playing, pausing, stopping, and skipping an audio track.

28. A computer storage medium storing thereon computer instructions for performing the following method for sharing digital audio, the method comprising:
- determining, at an inviter computer, whether a pre-specified online co-user account is currently active on an invitee computer;
- sending to the invitee computer, via an online message communication path, an invitation to establish a shared dynamic content experience between the inviter computer and the invitee computer;
- receiving from the inviter computer, an acceptance of the invitation;
- establishing a second communication path between the inviter computer and the invitee computer;
- communicating to the invitee computer, via the second communication path, information relating to a current dynamic content experience at the inviter computer;
- receiving from the invitee computer, via the second communication path, information relating to a current dynamic content experience at the invitee computer, wherein the information includes information related to a playlist;
- receiving from the invitee computer, via the second communication path, information relating to a current audio experience at the invitee computer, wherein the information relating to the current audio experience at the invitee computer comprises information that pertains to utilizing a playlist with a link to each of a plurality of tracks, each track comprising a digital audio file resident on the invitee computer;
- receiving a selection of one of the plurality of tracks by way of a selection of the corresponding link in the playlist; and
- transcoding an audio file at the invitee computer in accordance with information relating to the second communication path, and only if one of (a) the audio file is not protected by a rights-management system at the invitee computer and (b) the audio file is protected by a rights-management system at the invitee computer and the rights-management system determines that the audio file can be transcoded, the transcoding comprising converting at least one of a format and a sampling rate of the audio file into a format and/or sampling rate that is efficient for transmission via the second communications path.

29. A computer storage medium storing thereon computer instructions for performing the following method for sharing digital audio, the method comprising:
- receiving from an inviter computer, via an online message communication path, an invitation to establish a shared dynamic content experience between the inviter computer and an invitee computer;
- communicating to the inviter computer, an acceptance of the invitation;
- establishing a second communication path between the inviter computer and the invitee computer;
- communicating to the inviter computer, via the second communication path, information relating to a current dynamic content experience at the invitee computer;
- receiving from the inviter computer, via the second communication path, information relating to a current dynamic content experience at the inviter computer, wherein the information includes information related to a playlist;
- receiving from the inviter computer, via the second communication path, information relating to a current audio experience at the inviter computer, wherein the information relating to the current audio experience at the invitee computer comprises information that pertains to utilizing a playlist with a link to each of a plurality of tracks, each track comprising a digital audio file resident on the invitee computer;
- receiving a selection of one of the plurality of tracks by way of a selection of the corresponding link in the playlist; and
- transcoding an audio file at the invitee computer in accordance with information relating to the second communication path, and only if one of (a) the audio file is not protected by a rights-management system at the invitee computer and (b) the audio file is protected by a rights-management system at the invitee computer and the rights-management system determines that the audio file can be transcoded, the transcoding comprising converting at least one of a format and a sampling rate of the audio file into a format and/or sampling rate that is efficient for transmission via the second communications path.

* * * * *